Nov. 15, 1966  G. POEHLER ET AL  3,285,713
TUBE REACTORS
Filed Dec. 13, 1963
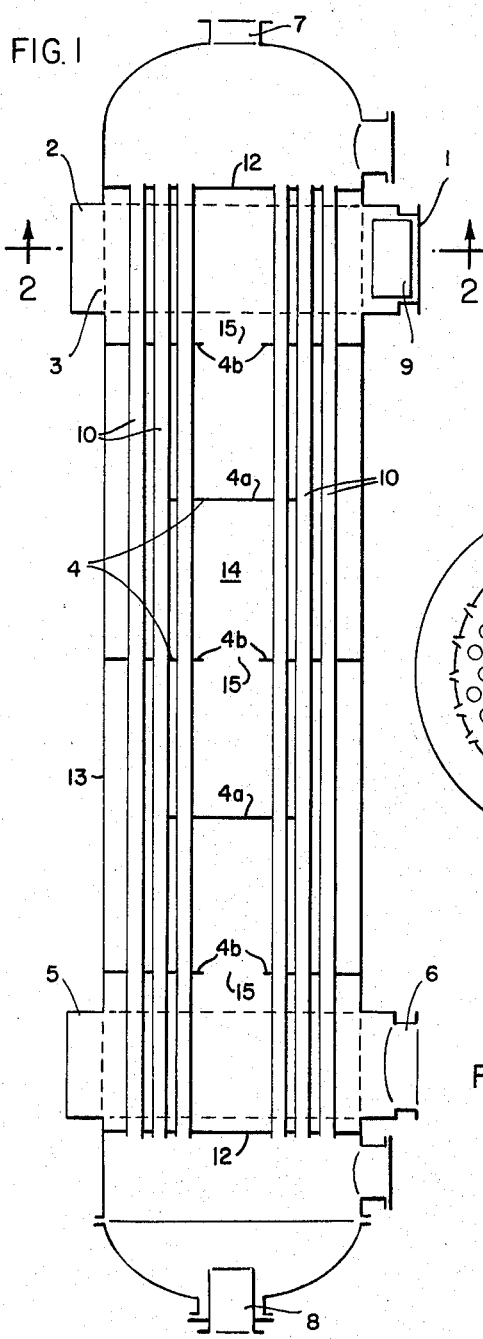
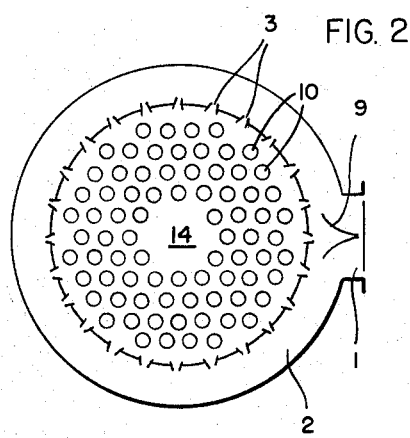
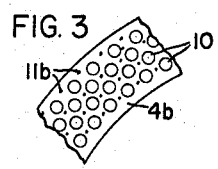
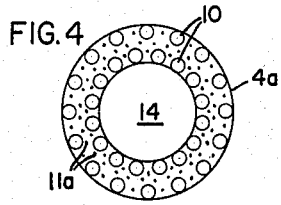
INVENTORS:
GUENTER POEHLER
ANTON WEGERICH
OTTO GOEHRE
HELLMUT GIEHNE
ATT'YS 3,285,713
TUBE REACTORS
Guenter Poehler, Ludwigshafen (Rhine), Anton Wegerich, Limburgerhof, Pfalz, Otto Goehre, Heidelberg, and Hellmut Giehne, Limburgerhof, Pfalz, Germany, assignors to Badische Anilin- & Soda-Fabrik Aktiengesellschaft, Ludwigshafen (Rhine), Germany
Filed Dec. 13, 1963, Ser. No. 330,366
Claims priority, application Germany, Dec. 18, 1962, B 70,019
8 Claims. (Cl. 23—288)

This invention relates to a tube reactor for carrying out endothermic catalytic reactions. The reactor is suitable for example for the dehydrogenation of paraffinic and naphthenic hydrocarbons and their derivatives, particularly for the dehydrogenation of alcohols.

Long kilns having built-in heating coils have hitherto been used for endothermic catalytic reactions. It has been very difficult to introduce into the furnace the heat required for the reaction. Very large furnaces have therefore been necessary, and these contained considerable amounts of catalyst in relation to the initial materials introduced. A change-over to tube reactors then took place in which less catalyst is required and considerably better space-time yields are achieved. In order that the heat supplied may reach into the interior of the catalyst tubes, tubes having small internal widths for example of 20 to 60 mm. have been chosen. Uniform distribution of temperature is obtainable in these tubes. To achieve good utilization of space in the reactors, a very large number of tubes, for example 4,000 to 6,000, is arranged in the reactor. Charging these tubes with pieces of catalyst is very difficult and takes a long time, particularly as each tube should contain the same amount of catalyst and offer temperature is obtainable in these tubes. To achieve uniform distribution of heat in the tube reactors it is necessary to use a liquid, for example a high boiling point oil, diphenyl or the like. Owing to the weight of these charges, a particularly expensive construction of the lower tube header is necessary.

We have now found that the said disadvantages in a tube reactor are obviated when the tubes have a diameter of at least 70 mm. and are distributed over the cross-section of the reactor in such a way that a central space is left free of tubes and when throughout the height of the reactor baffle plates are arranged alternately on the reactor wall and in the central space to deflect a gaseous heating medium which is passed through the reactor in cocurrent with the substances to be treated.

The cylindrical space which is left free of tubes in the center of the reactor may have a cross-section amounting to about 7 to 25%, advantageously about 9 to 20%, of the total cross-section of the reactor.

It is advantaeous to provide at one end of the reactor an annular duct which communicates with the interior of the reactor by openings for the supply of a heating gas, and to provide a similar duct at the other end for the withdrawal of the heating gas. The point of entry of the heating gas is advantageously constructed so that the current of gas is divided into two portions which pass through the annular duct in different directions. This may be achieved for example by the provision of distributing means in the shape of the bow of a ship. The openings for the passage of the gas into the interior of the reactor are advantageously formed as slots which gradually increase in size in the direction of flow. The cross-section of the annular duct should be about 5 to 20%, particularly 7 to 16%, of the cross-section of the reactor. The heating gas is introduced at the end of the reactor at which the substances to be treated are introduced into the tubes filled with catalyst, so that the two pass cocurrently through the reactor. Baffle plates are arranged in the central part and along the wall of the reactor so that the main flow of the heating gas is deflected alternately toward the middle and toward the wall of the reactor. These baffle plates in the central portion of the reactor should be large enough to occupy at least 90% of the central portion of the reactor which is free of tubes, and preferably large enough to project into the part of the reactor provided with tubes. These baffle plates which are arranged substantially perpendicular to the tubes have the form of coherent or perforated discs. It is advantageous for the portion of these baffles which is in the portion of the reactor free from tubes to be substantially closed, whereas any portion of the baffles which projects into area occupied by the tubes is advantageously perforated. The discs advantageously have a size which is about 25 to 60% of the cross-sectional area of the reactor. Further baffle plates are provided along the wall of the reactor, these baffles having the shape of rings in contact with the wall. Their cross-sectional area may be about 50 to 75% of the cross-sectional area of the reactor. Baffle plates are preferred which have as many perforations as possible, the diameter of the perforations being 3 to 10 mm. depending on the size of the reactor. In this way it is not the whole of the stream of gas which is deflected, but some of it passes through the baffle plates. Dead corners are thus avoided. The two types of baffle plates are arranged alternately at different heights. It is advantageous to arrange the baffle plates so that the heating gas stream first meets a baffle plate mounted on the reactor wall. The number of baffle plates to be installed in the reactor depends particularly on the length of the reactor. In conventional industrial reactors, which have a length of about 6 to 20 m., the baffles are spaced apart by about 50 cm. to 2 m. Another annular duct is provided at the other end of the reactor through which the heating gas leaves the reactor. The exhaust gas is heated up and for the most part returned to the reactor by means of a blower. The heat of the heating medium is uniformly distributed over the whole cross-section of the individual tubes by the construction of tube reactor according to this invention so that an equal conversion is achieved in each tube. In this way it is possible, in comparison with prior art tube reactors, to choose tubes having a large diameter and to use a gas instead of a liquid as heating medium. The time required for replacing catalysts may then be shortened considerably. Furthermore the number of tubes for a given reaction space may be lessened considerably and the amount of catalyst increased. Depending on the length of the reactor and its diameter which is usually about 1 to 5 m., about 70 to 250 tubes are required. The ratio of tube diameter to tube length should be between about 12:1000 and 17:1000, and the diameter of the tubes advantageously varies between 7 and 12 cm., particularly 8 to 12 cm. The length of the tubes, with the above-mentioned dimensions of the reactor, may vary between 5 and 12 m. The individual tubes are spaced apart from each other by 15 to 60 mm., particularly 20 to 50 mm.

A tube reactor constructed in accordance with this invention is particularly suitable for the dehydrogenation of paraffinic and naphthenic hydrocarbons and their derivatives. The reactor is particularly suitable for the dehydrogenation of substances which are sensitive to high temperatures, such as alcohols, for example cyclohexanol, alkylated cyclohexanols whose alkyl groups contain one to four carbon atoms, propanol and butanol. The alcohols may be converted into the corresponding ketones practically without any intramolecular dehydration. For this purpose, the tubes are filled with conventional catalysts having dehydrogenating or cracking action, in the form of pieces, for example balls, cylinders, pellets and cones. They may consist of metals of groups I–B to VIII–B of the Periodic Chart (Handbook of Chemistry and Physics, Chemical Rubber Publishing Co., 43rd edition, pp. 448–449), for example copper, zinc, molybdenum, tungsten, manganese, iron, nickel or cobalt, particularly in the form of their compounds, for example oxides, phosphates or halides. The said catalysts may be supported on conventional carrier materials, such as pumice, silicic acid, titanium oxide, aluminas and the like, or carriers having good thermal conductivity, such as materials containing iron oxide, for example a substance obtained in the production of aluminum and containing 50% $Fe_2O_3$, 24% $Al_2O_3$, 3% $SiO_2$, 8% $TiO_2$, 3% CaO and 4% $Na_2O$.

The invention will now be described with reference to the accompanying drawings in which a tube reactor is shown diagrammatically by way of example, FIGURE 1 being a sectional elevation and FIGURE 2 a section on the line A–B of FIGURE 1. FIG. 3 is an end elevation of a fragment of a perforated, peripheral baffle plate and the tubes extending therethrough, and FIG. 4 is an end elevation of a perforated, central baffle plate and the tubes extending therethrough.

Heating gas is introduced through line 1, is divided into two partial streams by a distributor 9 shaped like a ship's bow and then passes into annular duct 2 and through openings 3 into the interior of the reactor. The heating gas is deflected several times in direction during its passage through the reactor by baffle plates 4. The gas then collects at the opposite end of the reactor in an annular duct 5 and is withdrawn through line 6. The substances to be dehydrogenated are introduced into the reactor through inlet 7 and the reaction product leaves the reactor through pipe 8.

Accordingly, the tube reactor comprises a hollow shell 13 defining the tubular reactor. The hollow shell 13 has a header member or plate 12 extending transversely across the shell near each end thereof. A plurality of tubes 10 extend longitudinally in the shell between the header members or plates 12. The tubes are arranged in spaced relationship to each other with the axial center portion 14 of the shell 13 free of said tubes. The transverse cross-section area of the axial center portion 14 is 7–25% of the transverse cross-section of the shell.

The baffle plates 4 comprise a plurality of peripheral baffle plates 4b with center openings and central baffle plates 4a disposed in the shell in alternating, axially spaced relationship, said baffle plates being substantially perpendicular to the longitudinal axis of the shell 13. The peripheral baffle plates 4b have a plurality of small perforations 11b for passage therethrough of a part of the hot gas stream flowing through the shell over the tubes 10. The central baffle plates 4a have, in the peripheral areas extending beyond the axial center portion 14, a plurality of small perforations 11a for similar passage of a part of the hot gas stream. As aforesaid, the perforations eliminate dead spaces in the portions of the shell 13 external of the tubes 10. The central baffles 4a are positioned in the axial central portion of the shell 13 and the peripheral baffles extend inwardly from the wall of the shell 13 with the openings 15 thereof in the axial center portion 14 of the shell.

The following examples will further illustrate this invention.

EXAMPLE 1

4,000 kg. per hour of pure cyclohexanol is heated up to about 180° C. in a heat exchanger by means of hot vapors and gases leaving a tube reactor, and is then supplied to a column packed with Raschig rings which is connected to a circulating evaporator. The level of liquid at the bottom of the column is kept constant. 10 kg. of components of high boiling point is withdrawn per hour at the bottom. The vapors leaving the column are then passed into a second heat exchanger which is heated with reaction product coming direct from the tube reactor and then passed at a temperature of 260° C. into the tube reactor. The reactor contains 117 tubes each having an internal diameter of 100 mm. The diameter of the tube reactor is 1.80 m. and its height is 9 m. Each of the tubes is 6 m. in length and filled with 5 m.³ of a catalyst consisting of pumice to which 10% by weight of metallic copper has been applied. The tubes are spaced apart from each other by 30 mm., and are parallel to the wall of the reactor. The space left free in the middle has a cross-section which is about 13% of the cross-section of the reactor. The upper end of the reactor is provided with an annular duct about 1 m. in height whose cross-section is about 10% of the cross-section of the furnace. 35,000 m.³ (S.T.P.) of heating gas at a temperature of 390° C. is introduced hourly into this duct. Spaced apart by distances of 1.5 m., baffle plates are arranged alternately on the wall of the reactor and in the central space of the reactor. The cross-section of the baffle plates provided on the wall is about 60% of the cross-section of the reactor. The baffle plates in the middle of the reactor cross-section, which is free of tubes, are closed, whereas the part of the baffle plates which projects between the tubes has holes which are 5 mm. in diameter. The total size of the baffle plates is 45% of the reactor cross-section. The speed of the heating gas, whose flow is deflected several times by the baffle plates within the reactor, is 6.5 m./sec. 3,842 kg. per hour of a liquid reaction product is obtained from which by distillation 2,998 kg. of cyclohexanone and 734 kg. of cyclohexanol are obtained.

EXAMPLE 2

By leading 3,000 kg. per hour of secondary butanol through the reactor described in Example 1 under otherwise the same conditions, 2,600 kg. of methyl ethyl ketone is obtained.

We claim:

1. A tube reactor useful for the catalytic dehydrogenation of alcohols comprising a plurality of tubes in which the ratio of tube diameter to tube length is from 12:1000 to 17:1000 and the tube diameter is from 70 to 120 mm., said tubes being distributed over the cross-section of the reactor so that a central space is left free from tubes, the cross-sectional area of said central space being from 7 to 25% of the total cross-sectional area of the reactor, a plurality of baffle plates substantially perpendicular to said tubes and located alternately against the reactor wall and in the center of the cross-section of the reactor to deflect a gaseous heating medium, said central baffle plates having a surface area of 25 to 60% of the total cross-sectional area of said reactor and said baffle plates along the wall having a surface area of 50 to 75% of the total cross-sectional area of said reactor, and annular ducts arranged one at each end of said reactor and having openings communicating with the interior of said reactor for the supply and withdrawal of said gaseous heating medium.

2. A tube reactor useful for catalytic reactions comprising a hollow shell defining a tubular reactor, a header member extending transversely across said shell near each end thereof, a plurality of tubes extending longitudinally in said shell between said shell between said header members, said tubes being arranged in spaced relationship to each other with the axial center portion of said shell free of said tubes, the transverse cross section area of said axial center portion being 7–25% of the transverse cross section of said shell, a plurality of peripheral baffle plates and central baffle plates disposed in said shell between said header plates in axially spaced, alternating relationship, said baffle plates being substantially perpendicular to the longitudinal axis of said shell, said central baffle plates being in the axial central portion of said shell and said peripheral baffles extending inwardly from the wall of said shell with an opening therein in said axial center portion of said shell, said peripheral baffle plates having small perforations for passage therethrough of a part of a hot gas stream flowing through said shell across said tubes, said central baffle plates each having surface area of 25–60% of the transverse cross section area of said shell, and said peripheral baffle plates each having a surface area of 50–75% of the transverse cross section area of said shell.

3. A tube reactor as claimed in claim 2, wherein said perforations have a diameter in the range of 3–10 mm.

4. A tube reactor useful for catalytic reactions comprising a hollow shell defining a tubular reactor, a header member extending transversely across said shell near each end thereof, a plurality of tubes extending longitudinally in said shell between said header members, said tubes being arranged in spaced relationship to each other with the axial center portion of said shell free of said tubes, the transverse cross section area of said axial center portion being 7–25% of the transverse cross section of said shell, a plurality of peripheral baffle plates and central baffle plates disposed in said shell between said header plates in axially spaced, alternating relationship, said baffle plates being substantially perpendicular to the longitudinal axis of said shell, said central baffle plates being in the axial central portion of said shell and said peripheral baffles extending inwardly from the wall of said shell with an opening therein in said axial center portion of said shell, said central baffle plates having peripheral areas extending beyond said axial center portion into a part of the area occupied by said tubes, said peripheral areas having small perforations for passage therethrough of a part of a hot gas stream flowing through said shell across said tubes, said central baffle plates each having surface area of 25–60% of the transverse cross section area of said shell, and said peripheral baffle plates each having a surface area of 50–75% of the transverse cross section area of said shell.

5. A tube reactor as claimed in claim 4, wherein said shell has an annular, hot gas feed duct thereabout, and said shell has a plurality of openings distributed about its circumference and communicating said duct with the tube-containing portion of said shell near one of said header members.

6. A tube reactor as claimed in claim 4, wherein said perforations have a diameter in the range of 3–10 mm.

7. A tube reactor as claimed in claim 4, wherein the ratio of tube diameter to tube length is from 12:1000 to 17:1000 with a diameter of the tubes of from 70 to 120 mm.

8. A tube reactor as claimed in claim 4, wherein said cross-sectional area of said axial center portion is about 9 to 20% of the transverse cross-sectional area of said shell.

References Cited by the Examiner
UNITED STATES PATENTS

| 1,900,857 | 3/1935 | Berry et al. | 23—288 |
| 2,411,097 | 11/1946 | Kopp. | |

FOREIGN PATENTS

| 438,177 | 3/1912 | France. |

MORRIS O. WOLK, *Primary Examiner.*

JAMES H. TAYMAN, JR., *Examiner.*

UNITED STATES PATENT OFFICE
CERTIFICATE OF CORRECTION

Patent No. 3,285,713　　　　　　　　　　　　　　　November 15, 1966

Guenter Poehler et al.

It is hereby certified that error appears in the above numbered patent requiring correction and that the said Letters Patent should read as corrected below.

Column 1, lines 35 and 36, strike out "and offer temperature is obtainable in these tubes." and insert instead -- and offer the same resistance to the passage of vapors. --; line 55, for "advantaeous" read -- advantageous --; column 2, line 46, for "large" read -- larger --; column 4, line 63, strike out "said shell between", second occurrence.

Signed and sealed this 7th day of November 1967.

(SEAL)
Attest:

Edward M. Fletcher, Jr.　　　　　　　　　　　　　　EDWARD J. BRENNER
Attesting Officer　　　　　　　　　　　　　　　　　Commissioner of Patents